US008926234B2

(12) United States Patent
Engström et al.

(10) Patent No.: US 8,926,234 B2
(45) Date of Patent: Jan. 6, 2015

(54) INDEXABLE END-MILLING INSERT

(75) Inventors: Tord Engström, Sandviken (SE); Göran Pantzar, Sandviken (SE); Patrik Svedberg, Sandviken (SE); Magnus Åström, Täfteå (SE)

(73) Assignee: Sandvik Intellectual Property AB, Sandviken (SE)

( * ) Notice: Subject to any disclaimer, the term of this patent is extended or adjusted under 35 U.S.C. 154(b) by 571 days.

(21) Appl. No.: 12/149,531

(22) Filed: May 2, 2008

(65) Prior Publication Data

US 2008/0304924 A1 Dec. 11, 2008

(30) Foreign Application Priority Data

Jun. 5, 2007 (SE) ........................................ 0701370

(51) Int. Cl.
*B26D 1/12* (2006.01)
*B23C 5/20* (2006.01)
*B23C 5/16* (2006.01)
*B23C 5/22* (2006.01)

(52) U.S. Cl.
CPC ............... *B23C 5/2213* (2013.01); *B23C 5/202* (2013.01); *B23C 2200/205* (2013.01); *B23C 2200/208* (2013.01)
USPC .......................................................... 407/113

(58) Field of Classification Search
USPC .................. 407/34, 113, 114, 115, 116
See application file for complete search history.

(56) References Cited

U.S. PATENT DOCUMENTS

| | | | | |
|---|---|---|---|---|
| 4,632,607 A * | 12/1986 | Pantzar | ........................ | 407/113 |
| 5,007,775 A * | 4/1991 | Pantzar | ........................ | 407/113 |
| 5,145,295 A * | 9/1992 | Satran | ........................ | 407/113 |
| 5,368,418 A * | 11/1994 | Bentjens et al. | ............... | 407/114 |
| 5,382,118 A * | 1/1995 | Satran et al. | ..................... | 407/42 |
| 5,454,670 A * | 10/1995 | Noda et al. | ...................... | 407/42 |
| 5,597,271 A * | 1/1997 | Men et al. | ....................... | 407/113 |
| 5,810,521 A * | 9/1998 | Pantzar et al. | ................. | 407/114 |
| 5,971,672 A * | 10/1999 | Hansson | ........................ | 407/114 |
| 6,213,691 B1 * | 4/2001 | Leeb | ............................... | 407/34 |
| 6,769,844 B2 * | 8/2004 | Waggle | ........................ | 407/114 |
| 6,929,432 B2 * | 8/2005 | Roman et al. | ................. | 408/223 |
| 8,419,319 B2 * | 4/2013 | Hatta | ............................ | 407/113 |

FOREIGN PATENT DOCUMENTS

| | | | | |
|---|---|---|---|---|
| EP | 707911 A1 * | 4/1996 | ............... | B23B 27/14 |
| EP | 0 787 051 | 8/1997 | | |
| EP | 0 956 921 | 11/1999 | | |
| JP | 9-295213 | 11/1997 | | |
| JP | 2005169511 A * | 6/2005 | ............... | B23C 5/06 |
| JP | 2006088284 A * | 4/2006 | | |
| WO | 96/35538 | 11/1996 | | |

* cited by examiner

*Primary Examiner* — Kenneth E. Peterson
*Assistant Examiner* — Jennifer Swinney
(74) *Attorney, Agent, or Firm* — Morgan, Lewis & Bockius LLP

(57) ABSTRACT

An indexable end-milling insert including an underside, an upperside and a plurality of cutting edges that are formed between the upperside and a number of clearance sides and that include a chip-removing main edge as well as a surface-wiping wiper edge. The cutting insert has a square basic shape and includes four main edges and four wiper edges that are countersunk to a lower level than the main edges. The wiper edge is included in a lip projecting in relation to a secondary clearance surface and has a tertiary clearance surface, which laterally transforms into a primary clearance surface. The primary clearance surface has a width that decreases from the two opposite ends thereof toward a section having a smallest width therebetween.

20 Claims, 7 Drawing Sheets

INDEXABLE END-MILLING INSERT

This application claims priority under 35 U.S.C. §119 to Swedish Patent Application No. 0701370-9, filed on Jun. 5, 2007, which is incorporated by reference herein in its entirety.

FIELD OF THE INVENTION

The present invention relates generally to an indexable end-milling insert of the type that includes an underside, an upperside and a plurality of cutting edges that are formed between the upperside and a number of clearance sides, and individually include a chip-removing main edge as well as a surface-wiping wiper edge that transforms into the main edge via a corner of the cutting insert. The main edge extends arched between a first end and an opposite second end, which—in relation to the underside—is situated on a higher level than the first end. The main edge is delimited between a chip surface situated inside a cutting-edge line, and a convexly arched, primary clearance surface positioned outside the cutting-edge line and below which there is a secondary clearance surface.

BACKGROUND OF THE INVENTION

European Patent Document EP 0956921 discloses a cutting insert of the above-mentioned type for end milling. Advantages of this cutting insert are, among others, that the same is easy-cutting and provides uniform chip formation and good chip release along the entire length of the main edge, at the same time as the main edge has a good strength and a long service life, as a consequence of the clearance angle of the edge being constant along the entire edge length. Another advantage is that not only the functional clearance of the main edge, but also of the wiper edge in relation to the surfaces generated in the workpiece, becomes reliable. As such, early wearing of the clearance surfaces of the cutting edges is avoided. However, the last-mentioned advantage has been gained at the price of the disadvantage that the cutting insert includes only two usable cutting edges.

Within the field of cutting or chip removing machining, there is a constant aim to design the replaceable cutting inserts of the tools to have as many usable cutting edges as possible. In this respect, end-milling inserts are no exception. Hence, several proposals have been presented to form end-milling inserts with as many as four alternately usable cutting edges, by giving the cutting inserts a square or quadratic basic shape. See, for instance, European Patent Document EP 0787051, U.S. Pat. No. 5,597,271, International Patent Publication No. WO 96/35538, and U.S. Pat. No. 5,810,521.

However, the task of designing four-edged end-milling inserts involves a number of awkward weighings and problems because of the complicated space geometry of the milling-cutter tools and cutting inserts, the most difficult one to master of which is the design of the different clearances of the cutting insert. Thus, it is not only required that the pair of forwardly indexed, active cutting edges of the cutting insert, i.e., a main edge and a wiper edge running at an angle to the same, but also the inactive wiper edge in the extension of the active main edge, as well as the inactive main edge in the extension of the active wiper edge, obtain an acceptable clearance from the generated surfaces. More precisely, the active wiper edge should have a good tangential or rotational clearance so far that the clearance surface being rotationally behind the edge does not contact the plane bottom surface being machined by the same, at the same time as the inactive main edge in the extension of the wiper edge has to have a radial clearance in order not to contact the same surface. In an analogous way, the active main edge, which generates a shoulder or shoulder surface at an angle of 90° to the bottom surface, has to have a tangential clearance so far that the clearance surface being rotationally behind must not contact the shoulder surface, at the same time as the inactive wiper edge in the extension of the main edge neither is allowed to contact the shoulder surface.

Elementary, geometrically working solutions to the above-mentioned problems have been presented in European Patent Document EP 0787051 and U.S. Pat. No. 5,597,271. More precisely, the cutting insert designs disclosed in these two documents are based on the idea of countersinking the wiper edge toward the underside of the cutting insert and in relation to a main edge positioned along one and the same clearance side. In such a way, the wiper edge can, on one hand, work with acceptable clearance from the bottom surface in a state in which the cutting insert is tipped-in into a positive axial angle in the appurtenant milling cutter body, and on the other hand—after indexing of the cutting insert—assume an inactive state in which it does not contact the shoulder surface. This effect is attained by the fact that the cutting insert is held tipped-in at a negative radial angle. For the sake of clarity, the axial and radial angles are determined by the solid geometrical location of a support surface formed in the milling cutter body and against which the underside of the cutting insert is pressed.

Notwithstanding the fact that the two mentioned documents provide theoretical provisions about how the basal complex of geometry problems should be solved, the two solutions are insufficient in certain respects. Thus, in the basic designs thereof, the two cutting inserts are concretely described having straight main edges, and in addition to this, it is incidentally indicated the possibility of giving the main edges a generally curved shape. However, in both cases, the connections of the main edges to the wiper edges are of a kind that is not suitable for practical cutting-insert manufacture.

In this connection, cutting inserts of the kind in question are manufactured by compression moulding of a powder mass into a press body, which subsequently is sintered, for instance while forming cemented carbide. The compression moulding takes place in a tool that includes, on one hand, a die, the shape of which determines the shape of the clearance sides of the cutting insert, and on the other hand two stamps, which give the upperside and underside of the cutting insert the desired shape. For allowing a pressing operation, on one hand, to be carried out by accurate precision, and on the other hand to enable release of the press body from the moulding tool, it is required that the different part surfaces, which together define the overall shape of the cutting insert, do not include any sharp or abrupt transitions between one another. Neither must any individual part surface have too narrow a clearance angle, because otherwise the press body may be damaged when it is to be released. For these reasons, it is important that the different part surfaces are smoothly rounded.

The present invention aims at obviating the shortcomings of the end-milling inserts previously disclosed in European Patent Document EP 0787051 and U.S. Pat. No. 5,597,271, and at providing an improved end-milling insert.

An object of the invention to provide a practical, well-functioning, four-edged end-milling insert, which combines the advantages of the easy-cutting, curved main edges with theoretical geometry solutions. In other words, the invention aims at providing an end-milling insert that:

a) has four easy-cutting and strong main edges, which provide good chip formation and flexible chip evacuation, and which become worn evenly and slowly while ensuring a long service life of the cutting insert, b) has four wiper edges that, on one hand, in the active state thereof, have a good surface-wiping effect on a generated bottom surface, and on the other side, in the inactive state thereof, have a reliable clearance from a shoulder surface generated by an active main edge, and c) ensures that the inactive main edge, in the extension of an active wiper edge, obtains a good radial clearance from the wiper edge.

Another object of the invention is to provide an end-milling insert, the different part surfaces of which are smoothly rounded to allow a rational and efficient series manufacturing of the cutting insert.

Yet another object of the invention is to provide an end-milling insert that has a proportionally large underside or base surface in order to ensure a stable fixation of the same.

SUMMARY OF THE INVENTION

In an embodiment, the invention provides an indexable end-milling insert, including an underside, an upperside, and a plurality of cutting edges that are formed between the upperside and a number of clearance sides. The cutting edges individually include a chip-removing main edge and a surface-wiping wiper edge that transforms into the main edge via a corner of the cutting insert. The individual main edge extends arched between a first end and an opposite second end, which in relation to the underside, is situated on a higher level than the first end. The main edge is delimited between a chip surface situated inside a cutting-edge line, and a convexly arched, primary clearance surface positioned outside the cutting-edge line, below which there is a secondary clearance surface. The insert has a square basic shape and includes four main edges and four wiper edges, each wiper edge of which is situated along the same clearance side as a main edge, and is countersunk to a lower level than the main edge. The individual wiper edge is an upper borderline of a lip projecting in relation to the secondary clearance surface. The lip includes a tertiary clearance surface, which along one side transforms into the primary clearance surface via a transition surface. The primary clearance surface has a width that decreases from two opposite ends thereof toward a section having a smallest width therebetween.

In another embodiment, the invention provides a milling tool including a basic body a plurality of indexable end-milling cutter inserts. The basic body defines an axis of rotation and includes a plurality of insert seats spaced around the axis of rotation for receiving respective cutter inserts. Each cutter insert includes an underside, an upperside, and a plurality of cutting edges that are formed between the upperside and a number of clearance sides. The cutting edges individually include a chip-removing main edge and a surface-wiping wiper edge that transforms into the main edge via a corner of the cutting insert. The individual main edge extends arched between a first end and an opposite second end, which in relation to the underside, is situated on a higher level than the first end. The main edge is delimited between a chip surface situated inside a cutting-edge line, and a convexly arched, primary clearance surface positioned outside the cutting-edge line, below which there is a secondary clearance surface. The insert has a square basic shape and includes four main edges and four wiper edges, each wiper edge of which is situated along the same clearance side as a main edge, and is countersunk to a lower level than the main edge. The individual wiper edge is an upper borderline of a lip projecting in relation to the secondary clearance surface. The lip includes a tertiary clearance surface, which along one side transforms into the primary clearance surface via a transition surface. The primary clearance surface has a width that decreases from two opposite ends thereof toward a section having a smallest width therebetween.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
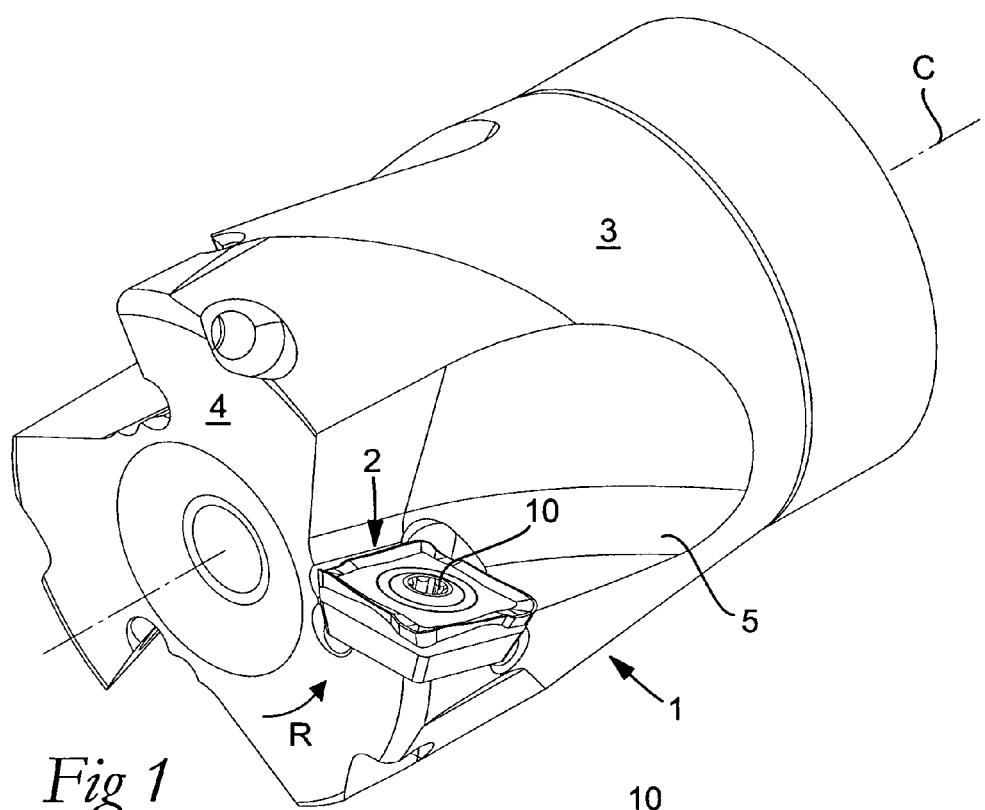
FIG. 1 is a perspective view of a milling-cutter tool in the form of an end mill including a rotatable basic body and a plurality of replaceable cutting inserts according to an embodiment of the invention, one of which is shown in a mounted state on the basic body.
Figure 2:
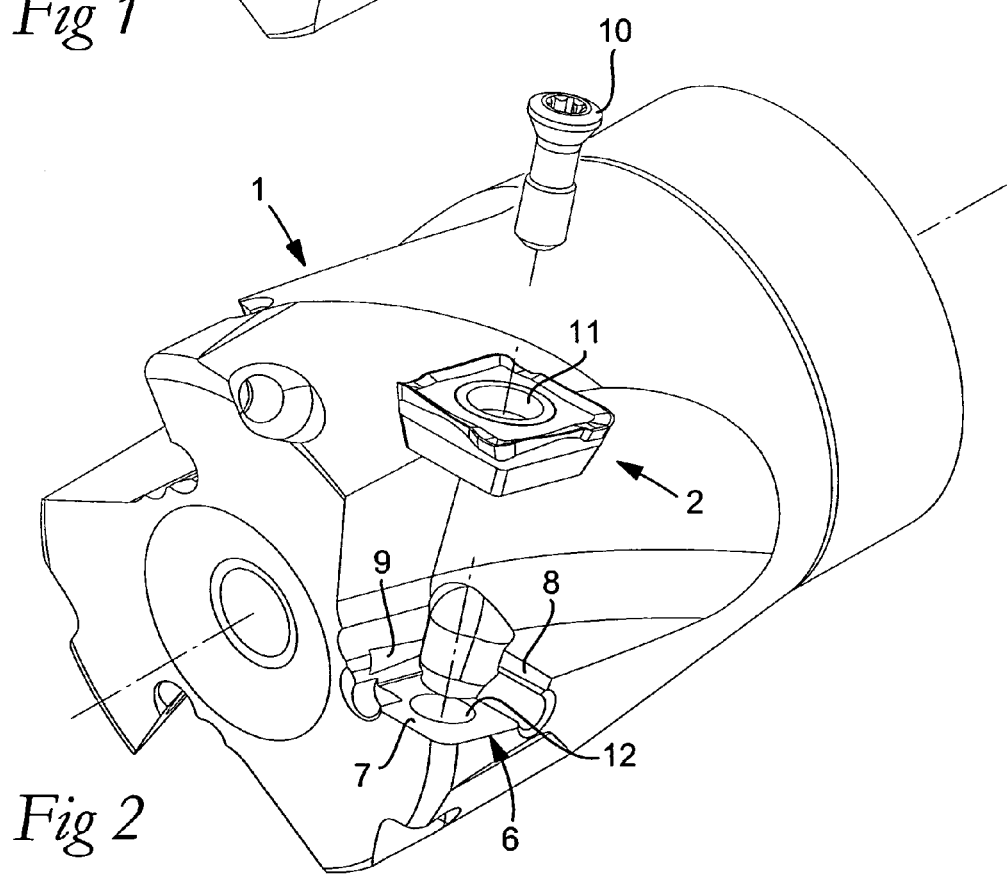
FIG. 2 is a perspective exploded view, showing the cutting insert and a tightening screw for the same that are spaced-apart from the basic body.

Below, a preferred embodiment of the cutting insert according to an embodiment of the invention will be described in detail, reference being made to the different drawing figures. First, a milling or basic body co-operating with the cutting insert will be described in more detail, and then the cutting insert as such.

The assembled milling-cutter tool shown in FIGS. 1-4 includes a basic body 1 and a plurality of cutting inserts 2, only one of which is shown in the respective figure. The basic body or the milling cutter body 1 is rotatable in the direction of rotation R around a center axis designated C, and has as a rotationally symmetrical envelope surface 3, as well as a front end surface 4. In the envelope surface as well as the end surface, a number of chip pockets 5 open, each one of which includes an insert seat 6 for the receipt of a cutting insert 2. In the example, the number of chip pockets and cutting inserts, respectively, is three.

In this case, the insert seat 6 includes a plane bottom surface 7 against which the underside of the cutting insert is pressable, as well as two side support surfaces 8, 9 against which clearance sides of the cutting insert are pressable. More precisely, the support surface 8 has the purpose of carrying axial cutting forces, while the support surface 9 carries the radial cutting forces at the same time as the bottom surface 7 carries the tangential cutting forces.

The cutting insert 2 is fixed in the insert seat 6 by a tightening element 10, which in this case is in the form of a screw having a male thread and a head, which in this case is conical. The screw may be brought through a through hole 11 in the cutting insert and is fastened in a female thread in a hole 12 mouthing in the bottom surface 7. By the fact that the screw 10 is made of steel, and thereby has a certain inherent elasticity, the same can apply not only an axial force straight down toward the bottom surface 7, but also lateral forces, to the cutting insert, which simultaneously press the cutting insert against the support surfaces 8, 9.

Figure 3:
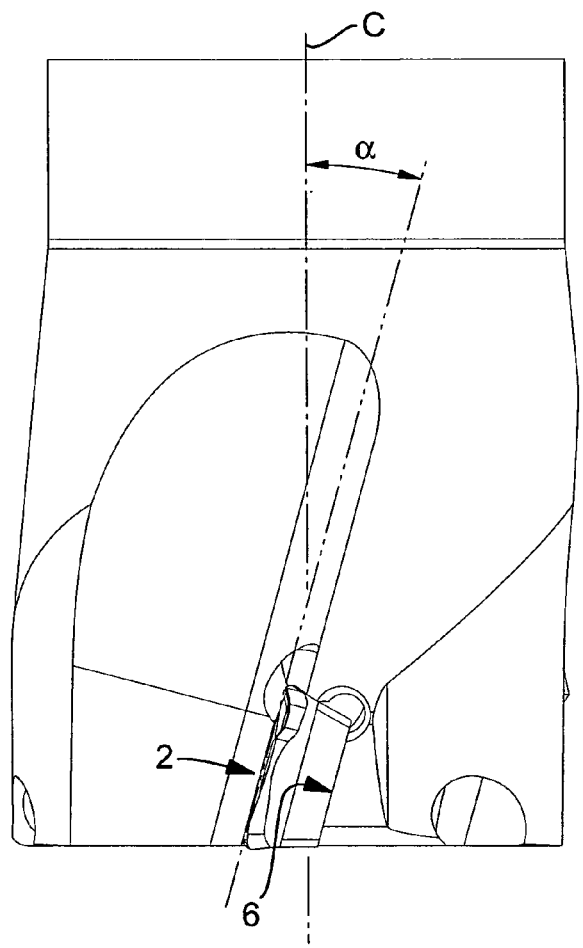
FIG. 3 is a side view of the tool according to FIG. 1.
Figure 4:
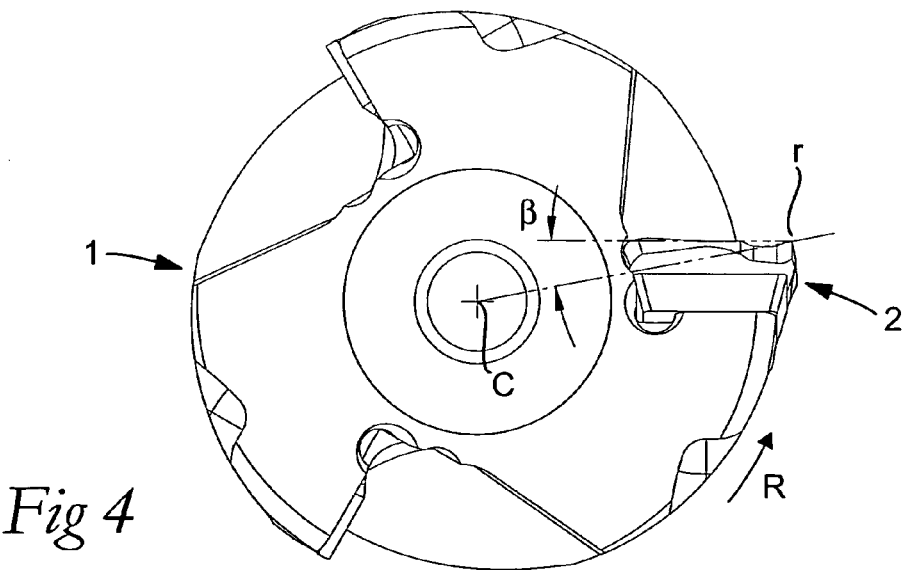
FIG. 4 is an end view of the same tool.
Figure 5:
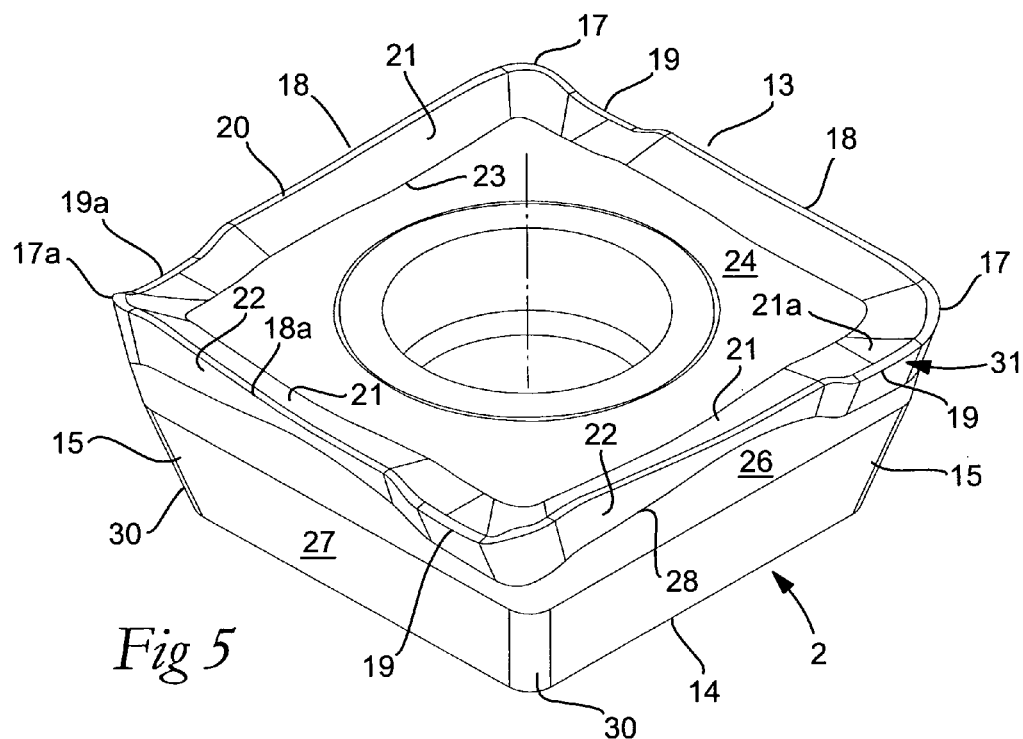
FIG. 5 is an enlarged top perspective view of the cutting insert according to an embodiment of the invention.
Figure 6:
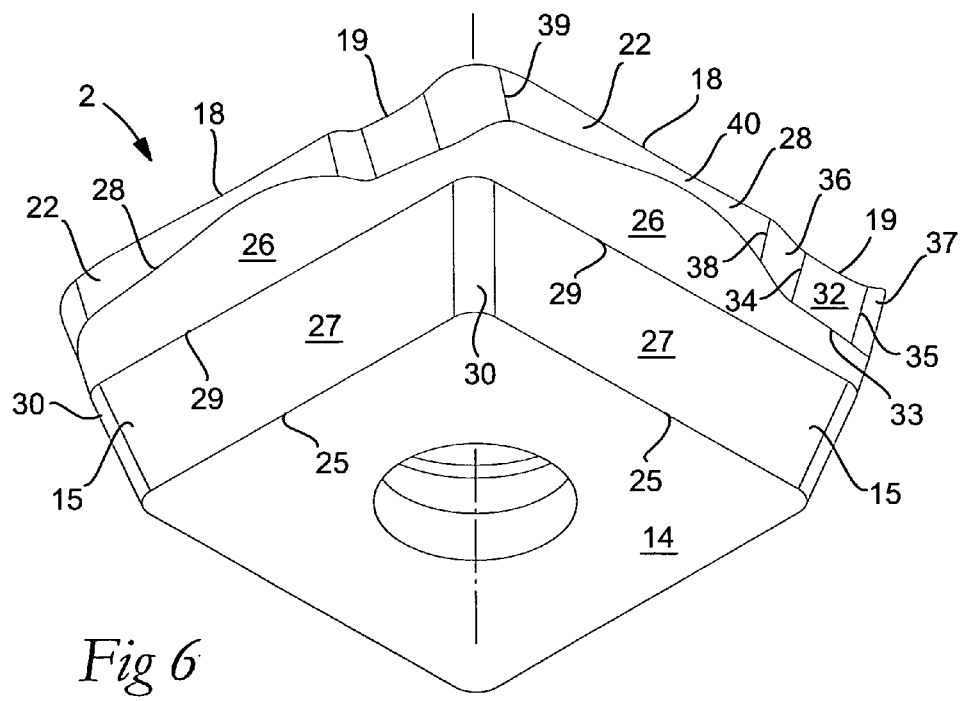
FIG. 6 is a bottom perspective view of the same cutting insert.

In FIGS. 3 and 4, it is illustrated how the insert seat 6 is shaped and solid-geometrically placed in the basic body 1 in such a way that the cutting insert 2 assumes a special tipping-in location in the same. More precisely, the cutting insert is tipped-in at a certain axial positive tipping-in angle α, as well as a certain negative, radial tipping-in angle β. The last-mentioned angle β, which in practice may vary within the range of 6-16°, is defined by the angle that the upperside of the cutting insert forms with an imaginary radius "r" between the center axis C of the basic body and a peripheral, active cutting edge of the cutting insert. In an analogous way, the angle α is defined by the angle at which the cutting insert leans axially in relation to the center axis C. In practice, the angle α varies within the range of 10-25°. In the example, a amounts to 15° and 0 to 10°.

It is important to keep apart the characteristics of the cutting insert according to the invention when the same is regarded, on one hand, alone beside the basic body, and on the other hand mounted in the basic body. In the first state, the cutting insert is regarded and defined generally in either plane elevation or side elevation, occurring clearances being nominal and related to the cutting insert's own center axis as well as the upperside and underside thereof. However, in the mounted state in the basic body, the clearances of the cutting insert are functional and dependent on the geometry of the basic body. In other words, occurring clearances and clearance angles are different depending on if they are nominal, i.e., specific to only the cutting insert as such, or functional, viz. in the tipped-in state in the tool.

Reference is now made to FIGS. 5-9, which show that the cutting insert 2 has a square basic shape and comprises an upperside 13, an underside 14 and four clearance sides 15, which extend between the upperside and underside, and form an obtuse angle with the underside, as well as an acute angle with the upperside. In the transition between the upperside and the clearance sides, cutting edges are formed, which meet each other in corners 17 and which together form a continuous cutting-edge formation along the periphery of the cutting insert. More precisely, the cutting insert includes four chip-removing main edges 18 and the same number of surface-wiping wiper edges 19. The cutting edges co-operate in pairs in such a way that an active main edge, which in order to be distinguished from the inactive main edges is designated 18a, co-operates with the wiper edge 19a that is connected to the same corner 17a as the active main edge. The other cutting edges 18, 19, are simultaneously inactive. This means that to the individual clearance side 15, a main edge and a wiper edge belong that are not active simultaneously. Thus, the wiper edge 19 shown in the extension of the main edge 18a is inactive when the last-mentioned one is active. In an analogous way, the main edge 18 shown in the extension of the wiper edge 19a is inactive when the last-mentioned one is active. The corners 17 are edge portions that form transitions between the main edges and the wiper edges. In the example, all cutting edges run in the extension of each other along a common, endless and peripheral cutting-edge line 20, which in a conventional way is in the form of a slender reinforcement bevel (0.05-0.20 mm).

The main edges 18 are delimited between, on one hand, chip surfaces 21, which are situated inside the cutting-edge line 20, and, on the other hand, external, primary clearance surfaces 22 situated immediately under the cutting-edge line. The chip surface 21 has a concave basic shape and extends from the cutting-edge line to a borderline 23 along a land 24, which forms a central part of the upperside 13 of the cutting insert. The individual chip surface adjacent to the wiper edge 19 is designated 21a.

In the embodiment, the underside 14 of the cutting insert is plane, to be applied against the plane bottom surface 7 in the insert seat 6 of the basic body 1. More precisely, the underside 14 has a square shape, and is delimited by four straight borderlines 25 that meet each other at right angles. The underside 14 forms a base surface. The larger the base surface is, the more stable the abutment of the cutting insert against the bottom surface 7 of the insert seat becomes.

Under the primary clearance surfaces 22, secondary clearance surfaces 26 are formed, which in turn transform into lower support surfaces or support flanks 27. These part surfaces are spaced-apart by borderlines 28, 29. Each individual support flank 27 extends between two corner surfaces 30 that are convexly rounded. The support flanks 27 include plane surfaces that are of uniform narrowness as a consequence of the borderlines 25 and 29 being parallel to each other. The shape of the two clearance surfaces 22, 26, which is important for the realization of the invention, will be described in more detail below.

The individual wiper edge 19 is formed on a projecting lip or protrusion 31, which is cross-sectionally wedge-shaped. More precisely, the wiper edge 19 forms an upper borderline for a tertiary clearance surface 32, which in the example transforms into the secondary clearance surface 26 via a lower borderline 33. Laterally, the surface 32 is delimited by substantially vertical borderlines 34, 35, the first-mentioned one of which abuts on a transition surface 36 toward the primary clearance surface 22, and the second abuts on a corner clearance surface 37 under the corner edge 17. The primary clearance surface 22 extends between first and second borderlines 38, 39, which also define first and second ends of the individual main edge 18. The tertiary clearance surface 32 may be plane or slightly concave, while the surfaces 36, 37 are convexly arched.

Figure 8:
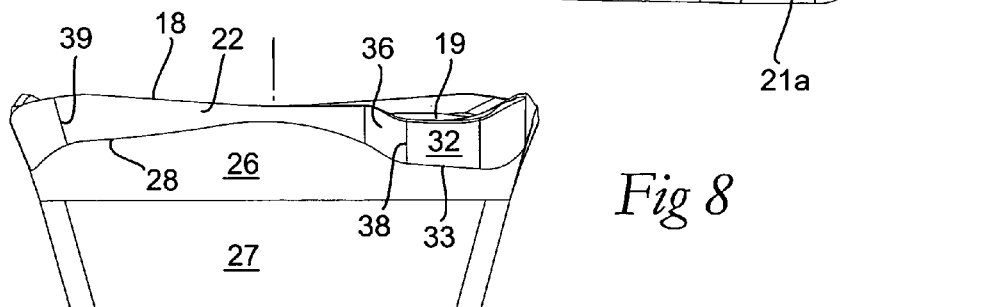
FIG. 8 is a side view of the cutting insert.
Figure 9:
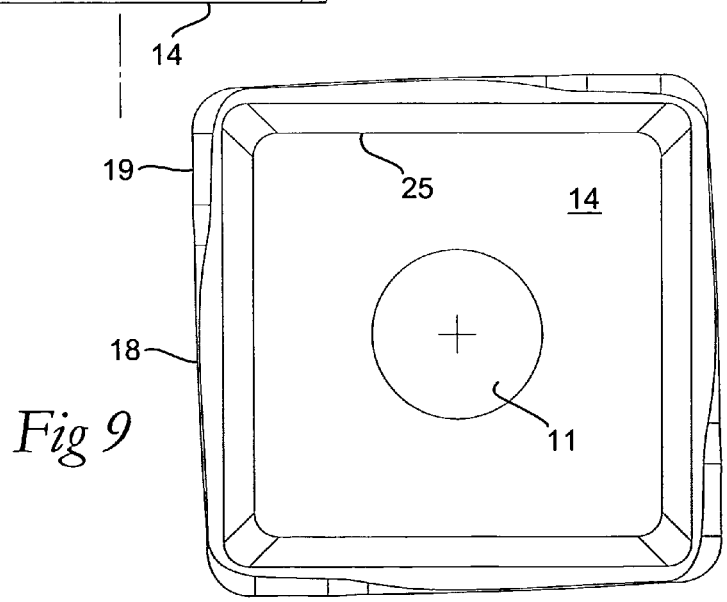
FIG. 9 is a planar view from below of the cutting insert.

As is clearly seen in FIG. 8, the wiper edge 19 is countersunk in relation to the main edge 18, i.e., situated nearer the underside 14 of the cutting insert than the main edge. The main edge 18 has the highest point thereof situated in the vicinity of the second end 39 and the lowest point thereof nearer the first end 38. As viewed in side elevation according to FIG. 8, the part of the main edge 18 situated closest to the end 39 has a convex arc-shape, while the part situated closest to the end 38 has a concave arc-shape.

Figure 7:
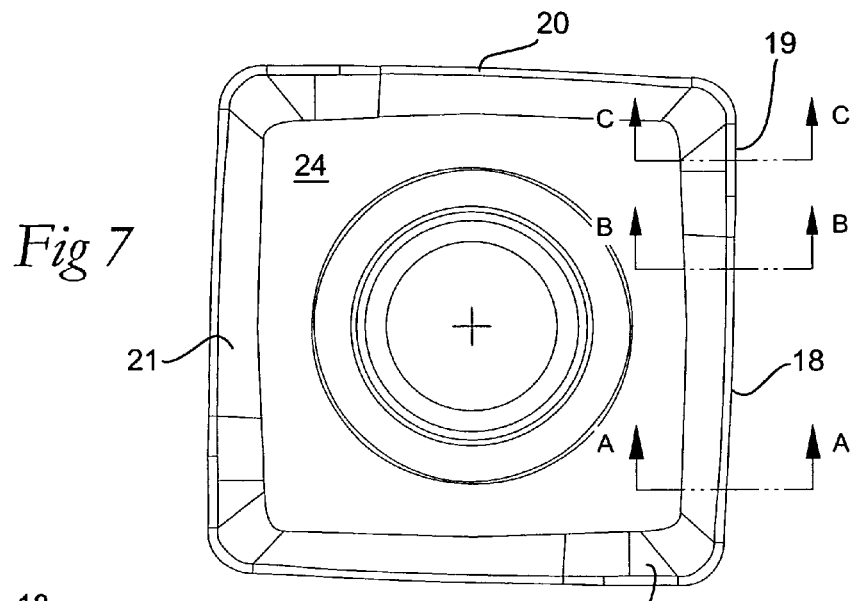
FIG. 7 is a planar view from above of the cutting insert.

When the cutting insert is viewed in plane elevation from above according to FIG. 7, the wiper edge 19 is situated somewhat outside an imaginary extension of the main edge 18. The measure by which the wiper edge is laterally displaced in relation to the extension of the main edge is, however, within the range of 0.001-0.1 mm, and therefore the displacement cannot be perceived by the naked eye.

In this connection, the wiper edge 19 also could be located inside the imaginary extension of the main edge 18. However, the further inward the wiper edge is situated, the poorer the functional clearance behind the wiper edge, i.e., along the clearance surface 32, becomes.

Figure 12:
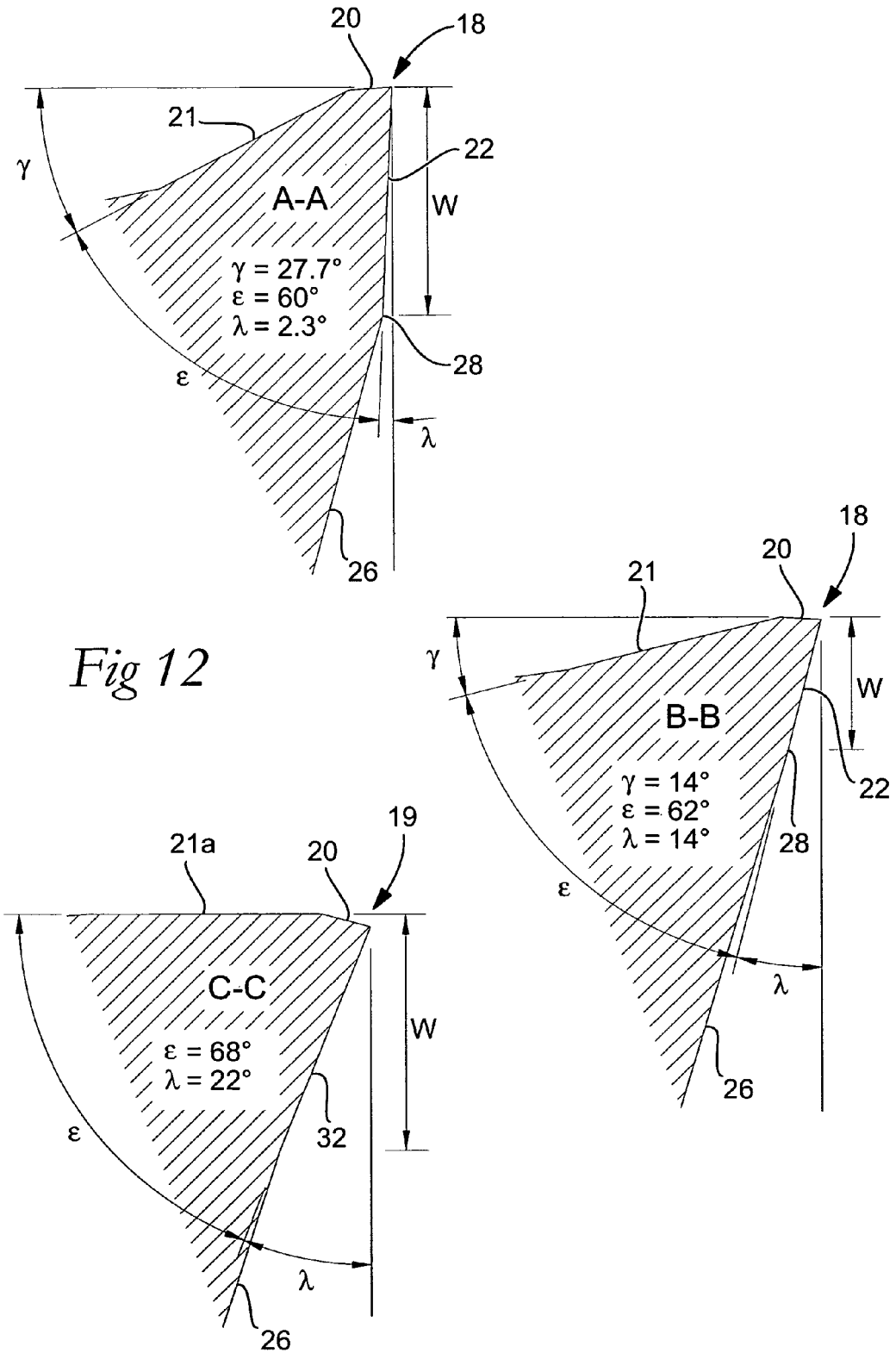
FIG. 12 is three enlarged detailed sections A-A, B-B and C-C in FIG. 7.

Reference is now made to FIG. 12, which illustrates the nominal rake angle γ, the cutting edge angle ε, and the clearance angle λ of the cutting insert in the different sections A-A, B-B and C-C in FIG. 7. In the section A-A, where the main edge 18 has the highest point thereof, the rake angle γ is considerably larger than the clearance angle λ. Thus, in the concrete example, γ amounts to 27.7° and λ to 2.3°, the edge angle ε being 60°. In the section B-B, which is situated approximately where the main edge 18 has the lowest point thereof, the rake angle γ is considerably smaller and the clearance angle λ considerably larger than in the section A-A. In the example, γ as well as λ amount to 14°, and the edge angle ε to 62°. Between these extreme values, γ and λ are altered essentially continuously between the two ends of the main edge, while the edge angle ε keeps a substantially constant value in the range of 60°. More precisely, the rake angle γ is decreased from the highest situated end 39 toward the lowest situated end 38, while the clearance angle λ increases from the end 39 toward the end 38.

In the section C-C, which intersects the wiper edge 19, the rake angle has been reduced to zero and the edge angle ε increased to 68°, the clearance angle λ of the tertiary clearance surface 32 having increased to 22°.

With renewed reference to FIGS. 5-9, it should be pointed out that the primary clearance surface 22 along the individual main edge 18 has a width that decreases from the two opposite ends 38, 39 thereof toward a smallest width in an area designated 40. This area is situated approximately halfway between two corners of the cutting insert, i.e., approximately along the center of the individual clearance side. The reason for this reduction of the width of the clearance surface 22 is as follows.

The lower support flank 27 is a plane surface, while the primary clearance surface 22 is convexly arched. Because the secondary clearance surface 26 forms a transition surface or a so-called free-form surface between the plane surface 27 and the arched surface 22, the surface 26 has to be given a successively increasing convexity in the upward direction along the cutting insert, more precisely, in such a way that the radius determining the convexity is smallest approximately in the area 40, so as to then successively increase toward the two corners of the clearance side. If the primary clearance surface 22 would be uniform in width along the entire length thereof, this convexity of the surface 26 would prevent an acceptable functional clearance, such as will be explained in more detail, reference being made to FIGS. 10, 11, 13 and 14.

Figure 10:
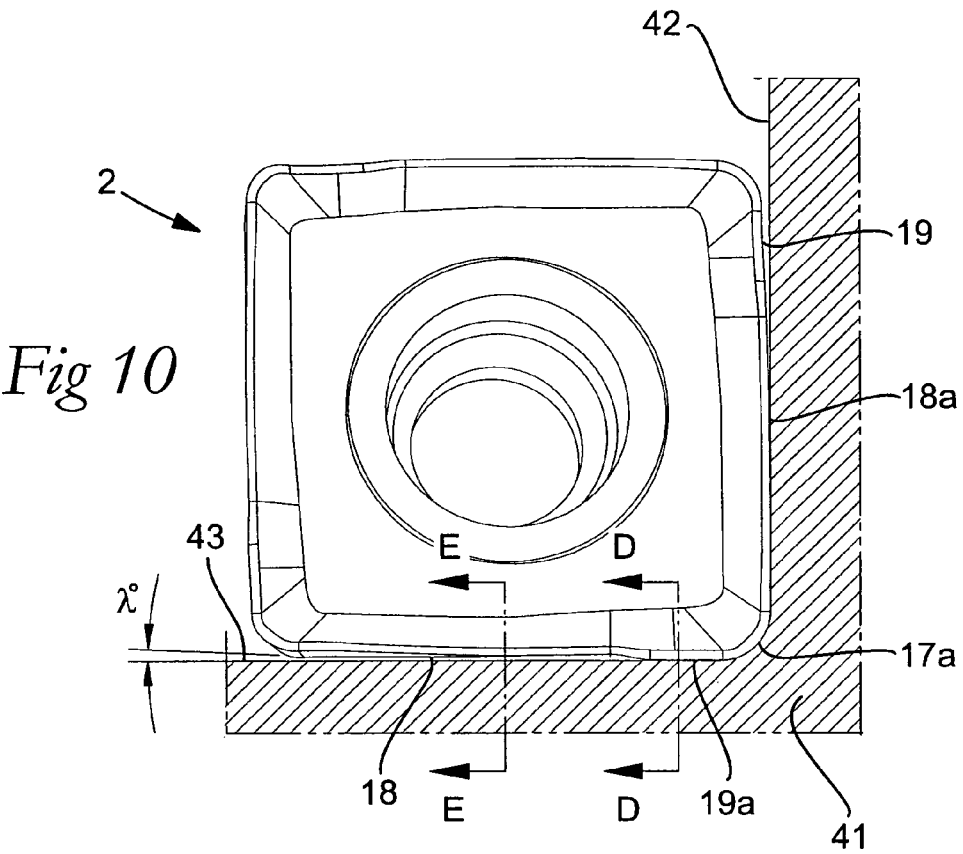
FIG. 10 is a front view of an active cutting insert adjacent to shoulder and bottom surfaces of a workpiece.
Figure 11:
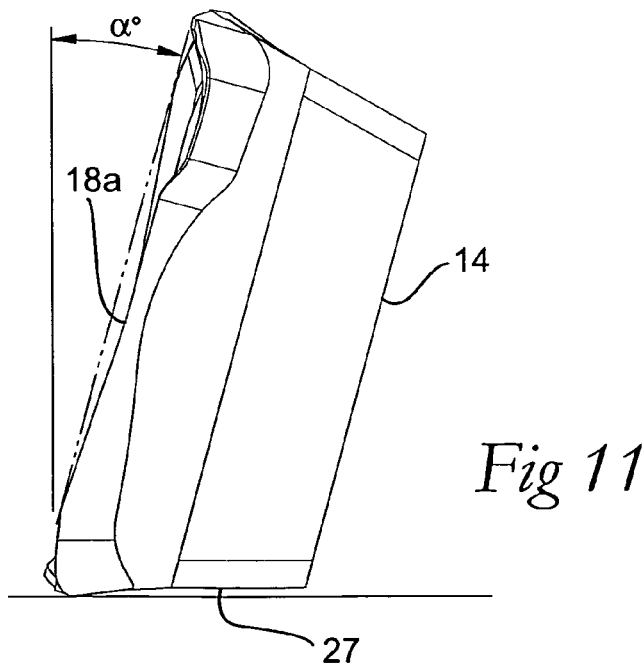
FIG. 11 is a side view of the cutting insert according to FIG. 10, showing how the same is inclined in a certain axial tipping-in location.

In FIG. 10, the cutting insert 2 is shown in an active state adjacent to a workpiece 41 in which there is to be generated a shoulder surface or shoulder 42 as well as a bottom surface 43 at a substantially right angle to the shoulder surface 42. In the state shown in FIG. 11, the cutting insert is tipped-in into a positive axial angle α, which in the example amounts to 15°. In doing so, the principal chip removal is effected by the active main edge 18a, at the same time as the wiper edge 19a provides for a surface-wiping effect (which manifests itself in that occurring irregularities are removed, however without proper chips being removed). The chip being removed is approximately of a uniform thickness along the main edge 18a, and obtains a successively decreasing thickness along the corner edge 17a.

Figure 13:
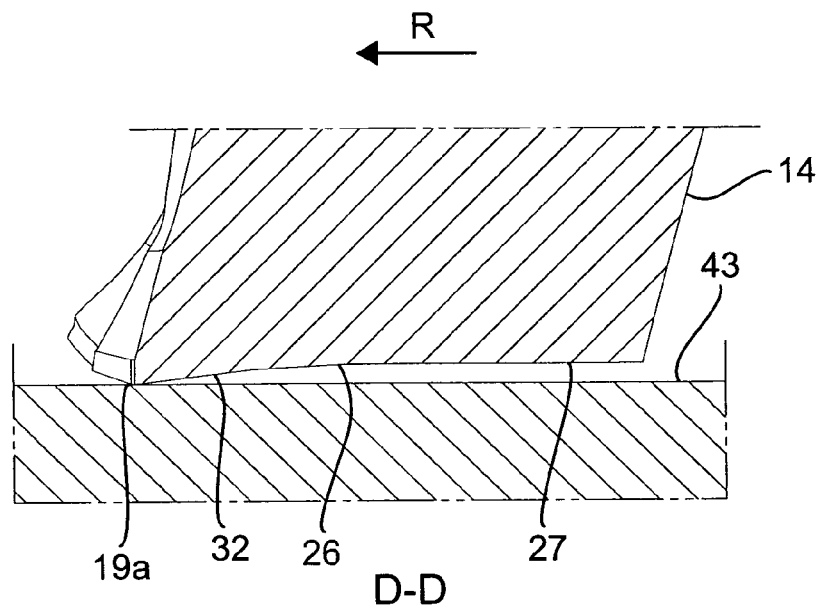
FIG. 13 is a section D-D in FIG. 10.
Figure 14:
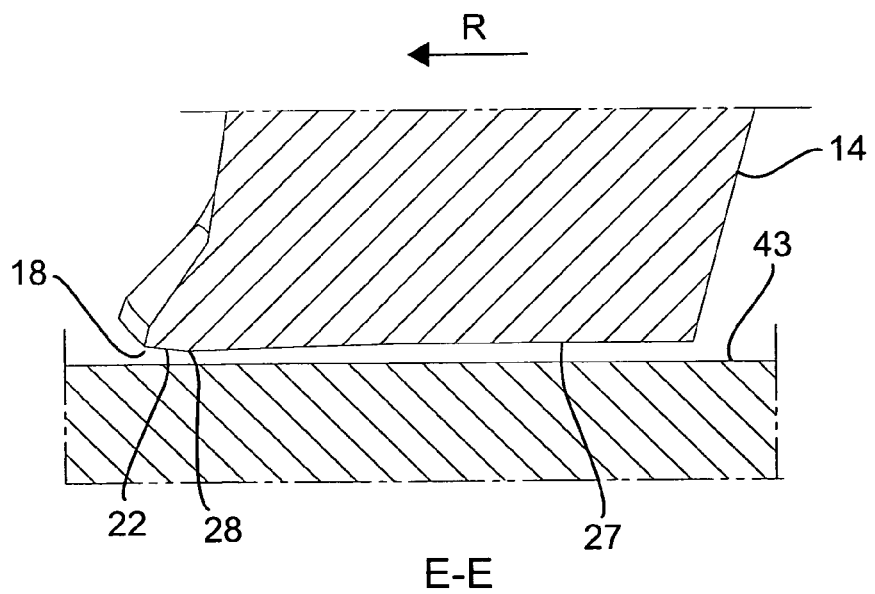
FIG. 14 is a section E-E in FIG. 10.

As is clearly seen in FIG. 10, the inactive wiper edge 19 in the extension of the active main edge 18a has good clearance from the shoulder surface 42, more precisely, as a consequence of the negative radial tipping-in β according to FIG. 4. Simultaneously, the active wiper edge 19a has good tangential or rotational clearance, as is seen in FIG. 13 (the section D-D in FIG. 10). By the fact that the clearance angle λ of the tertiary clearance surface 32 is fairly large (22°), accordingly the surface 32 clears quickly from the generated bottom surface 43. Behind the surface 32, as viewed in the direction of rotation R, the other clearance surfaces of the cutting insert, i.e., the surfaces 26, 27, have good clearance from the generated surface 43. In practice, the last-mentioned surfaces 26, 27 may be substantially parallel to the surface 43, something that in practice ensures that the base surface, i.e., the underside 14, of the cutting insert becomes optimally large.

In the same way as the active wiper edge 19a can be said to be turned forward/downward when the cutting insert is tilted-in axially, also the borderline 28 between the primary and secondary clearance surfaces 22, 26 will be turned forward/downward. If the primary clearance surface 22 along the main edge 18 would be uniform in width along the entire length thereof, the borderline 28 of the inactive main edge 18 would come to drag against or be located very close to the generated surface 42. However, as a consequence of the fact that the width of the clearance surface 22 has been reduced in the way described above, the inactive main edge will obtain a good radial clearance from the surface 43, as is clearly seen in FIG. 14 (the section E-E in FIG. 10). In other words, not only a good tangential clearance from the active wiper edge is ensured, but also a good radial clearance of the inactive main edge in the extension of the active wiper edge.

Thus, by the invention, conditions are provided to series-manufacture four-edged end-milling inserts that have strong and easy-cutting main edges combined with the same number of wiper edges in such a way that a co-operating pair of active cutting edges generate smooth surfaces at an angle of 90° to each other in the workpiece, at the same time as the inactive cutting edges in the extension of the active ones obtain an ample clearance from the two generated surfaces in all coordinate directions.

While the invention has been disclosed with reference to certain preferred embodiments, numerous modifications, alterations, and changes to the described embodiments are possible without departing from the sphere and scope of the invention, as defined in the appended claims and their equivalents thereof. For example, it is possible to connect the cutting insert with the basic body via the modern type of interface that includes male and female elements engaging mechanically in each other (serration connections), and to fix the same by other tightening elements than screws, e.g., clamps, wedges or the like. Furthermore, the generally convex and double curvature shape of the main edges may be provided by a plurality of consecutive facet surfaces, instead of by means of continuous, smooth surfaces such as have been exemplified in the drawings. Accordingly, it is intended that the invention not be limited to the described embodiments, but that it have the full scope defined by the language of the following claims.

What is claimed is:

1. An indexable end-milling insert, comprising:
an underside, an upperside, and a plurality of cutting edges that are formed between the upperside and a number of clearance sides, the cutting edges individually include a chip-removing main edge and a surface-wiping wiper edge that transforms into a next main edge via a corner of the cutting insert;
the individual main edge extending arched between a first end and an opposite second end, which in relation to the underside, is situated on a higher level than the first end, wherein the individual main edge is arched concavely proximate the first end the main edge being delimited between a chip surface situated inside a cutting-edge line, and a concavely arched primary clearance surface positioned outside the cutting-edge line, below which there is a convexly arched secondary clearance surface, the primary clearance surface being defined between the first and second ends of the main cutting edge;

a planar support flank below the secondary clearance surface, the secondary clearance surface forming a transition between the concavely arched primary clearance surface and the planar support flank; and the insert having a square basic shape and including four main edges and four wiper edges, each wiper edge of which is situated along the same clearance side as one main edge, transforms into the first end of the one main edge, and is countersunk to a lower level than the one main edge;

wherein the individual wiper edge is an upper borderline of a lip projecting in relation to the secondary clearance surface, the lip having a tertiary clearance surface, which along one side of the insert transforms into the primary clearance surface on the same one side of the insert via a transition surface, wherein the secondary clearance surface extends under the tertiary clearance surface, the primary clearance surface having a width that decreases from the two opposite ends thereof toward a section having a smallest width therebetween at an area where the individual main edge is concave and the secondary clearance surface is convex, and wherein a clearance angle of the primary clearance surface increases from the second end to the first end of the main cutting edge.

2. The end-milling insert according to claim 1, wherein the section of the primary clearance having the smallest width is located in the vicinity of the center of the individual clearance side.

3. The end-milling insert according to claim 2, wherein, at the bottom of the tertiary clearance surface, the tertiary clearance surface transforms into the secondary clearance surface.

4. The end-milling insert according to claim 1, wherein, at the bottom of the tertiary clearance surface, the tertiary clearance surface transforms into the secondary clearance surface.

5. The end-milling insert according to claim 1, wherein the tertiary clearance surface is planar.

6. The end-milling insert according to claim 1, wherein the wiper edge is situated outside of an imaginary extension of the main edge by a distance of 0.001 to 0.1 mm.

7. The end-milling insert according to claim 1, wherein each wiper edge is laterally displaced outwardly in relation to an extension of the main edge.

8. The milling tool according to claim 1, wherein the transition surface is convexly arched.

9. The milling tool according to claim 1, wherein the secondary clearance surface successively increases in convexity towards the upperside of the insert.

10. The end-milling insert according to claim 1, wherein a nominal rake angle of the chip surface decreases from the second end to the first end of the main cutting edge.

11. A milling tool comprising a basic body and a plurality of indexable end-milling cutter inserts, the basic body defining an axis of rotation and having a plurality of insert seats spaced around the axis of rotation for receiving respective cutter inserts, each cutter insert comprising:

an underside, an upperside, and a plurality of cutting edges that are formed between the upperside and a number of clearance sides, the cutting edges individually include a chip-removing main edge and a surface-wiping wiper edge that transforms into a next main edge via a corner of the cutting insert;

the individual main edge extending arched between a first end and an opposite second end, which in relation to the underside, is situated on a higher level than the first end, wherein the individual main edge is arched concavely proximate the first end the main edge being delimited between a chip surface situated inside a cutting-edge line, and a concavely arched primary clearance surface positioned outside the cutting-edge line, below which there is a convexly arched secondary clearance surface, the primary clearance surface being defined between the first and second ends of the main cutting edge;

a planar support flank below the secondary clearance surface, the secondary clearance surface forming a transition between the concavely arched primary clearance surface and the planar support flank; and the insert having a square basic shape and including four main edges and four wiper edges, each wiper edge of which is situated along the same clearance side as one main edge, transforms into the first end of the one main edge, and is countersunk to a lower level than the one main edge;

wherein the individual wiper edge is an upper borderline of a lip projecting in relation to the secondary clearance surface, the lip having a tertiary clearance surface, which along one side of the insert transforms into the primary clearance surface on the same one side of the insert via a transition surface, the primary clearance surface having a width that decreases from the two opposite ends thereof toward a section having a smallest width therebetween at an area where the individual main edge is concave and the secondary clearance surface is convex, and wherein a clearance angle of the primary clearance surface increases from the second end to the first end of the main cutting edge.

12. The milling tool according to claim 11, wherein each insert is seated with a positive axial angle $\alpha$ and a negative radial angle $\beta$.

13. The milling tool according to claim 12, wherein angle $\alpha$ is within the range of 10-25° and angle $\beta$ is within the range of 6-16°.

14. The milling tool according to claim 11, wherein each wiper edge is laterally displaced outwardly in relation to an extension of the main edge.

15. The milling tool according to claim 11, wherein the transition surface is convexly arched.

16. The milling tool according to claim 11, wherein the secondary clearance surface successively increases in convexity towards the upperside of the insert.

17. The milling tool according to claim 11, wherein a nominal rake angle of the chip surface decreases from the second end to the first end of the main cutting edge.

18. An end-milling insert, comprising:
an underside;
an upperside;
four clearance sides, each clearance side extending from the underside to the upperside; and
a continuous cutting edge along a periphery of the upperside, a chip surface located inside the continuous cutting edge on the upperside, and the four clearance sides located outside the continuous cutting edge;

each of the four clearance sides including:

a main cutting edge and a wiper cutting edge both forming part of the continuous cutting edge, the main cutting edge and the wiper cutting edge being adjacent to each other, the wiper cutting edge being countersunk lower than the main cutting edge relative to the underside;

a primary clearance surface below the main cutting edge and defined between two ends of the main cutting edge, a first of the two ends being lower than a second of the two ends relative to the underside of the insert, the wiper cutting edge transitioning into the main cutting edge at the first end, the main cutting edge being delimited between the chip surface and the primary clearance surface;

a tertiary clearance surface below the wiper cutting edge, the wiper cutting edge being delimited between the chip surface and the tertiary clearance surface;

a secondary clearance surface below both the primary clearance surface and the tertiary clearance surface; and a planar support flank below the secondary clearance surface, wherein the secondary clearance surface transitions via a convex borderline into the primary clearance surface, and the primary clearance surface transitions via a concave borderline into the main cutting edge, such that the primary clearance surface has a width that decreases from the two ends of the main cutting edge to a smallest width therebetween at an area where the borderline forming the transition between the primary clearance surface and the main cutting edge is concave and the borderline forming the transition between the secondary clearance surface and the primary clearance surface is convex; and wherein a clearance angle of the primary clearance surface increases from the second end to the first end of the main cutting edge, wherein the wiper cutting edge, tertiary clearance surface, secondary clearance surface, and planar support flank of one of the four clearance sides transition respectively into the main cutting edge, primary clearance surface, secondary clearance surface, and planar support flank of another one of the four clearance sides via a corner of the insert.

19. The end-milling insert of claim 18, wherein the borderline forming the transition between the primary clearance surface and the main cutting edge is also convex.

20. The end-milling insert of claim 18, wherein a nominal rake angle of the chip surface decreases from the second end to the first end of the main cutting edge.

* * * * *